United States Patent [19]

Tegtmeier

[11] 4,447,089
[45] May 8, 1984

[54] SAFETY LATCH FOR EXTENSIBLE LIFT MECHANISMS

[75] Inventor: Sheldon D. Tegtmeier, West Fargo, N. Dak.

[73] Assignee: Tegtmeier & Sons, Inc., West Fargo, N. Dak.

[21] Appl. No.: 448,347

[22] Filed: Dec. 9, 1982

[51] Int. Cl.³ .............................................. B60P 1/34
[52] U.S. Cl. ................................. 298/11; 105/261 R; 298/18; 298/38
[58] Field of Search .................. 298/11, 12, 13, 17 B, 298/22 P, 38; 414/471; 105/261 R

[56] References Cited

U.S. PATENT DOCUMENTS

| | | | |
|---|---|---|---|
| 3,083,058 | 3/1963 | Walstrom et al. | 298/11 |
| 3,844,617 | 10/1974 | Kostman | 298/11 |
| 3,880,468 | 4/1975 | Steingas et al. | 298/11 |
| 4,029,357 | 6/1977 | Bishop | 298/11 |

Primary Examiner—Leslie J. Paperner
Attorney, Agent, or Firm—John W. Adams

[57] ABSTRACT

A safety latch mechanism for extensible strut elements mounted on stationary strut members such as are used for farm dump boxes, said latch mechanism including elongated latch bars pivotally mounted at their upper ends on the extensible strut elements for longitudinal movement therewith, stop lugs respectively fixed to the stationary strut members for respectively engaging the latch bars when said strut elements are in extended position, and a releasing lever pivotally mounted on the lower end of each latch bar, and having a fulcrum positioned to engage the lever to release each latch bar when the dump box is in lowered position to engage the releasing lever.

9 Claims, 4 Drawing Figures

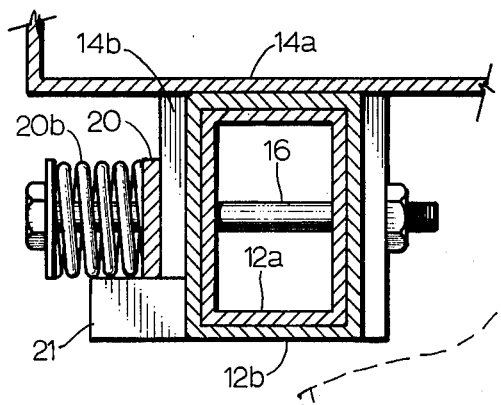
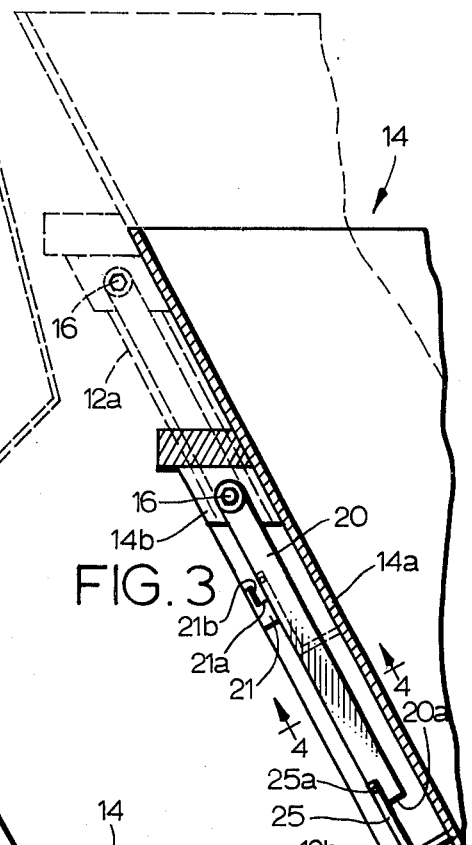
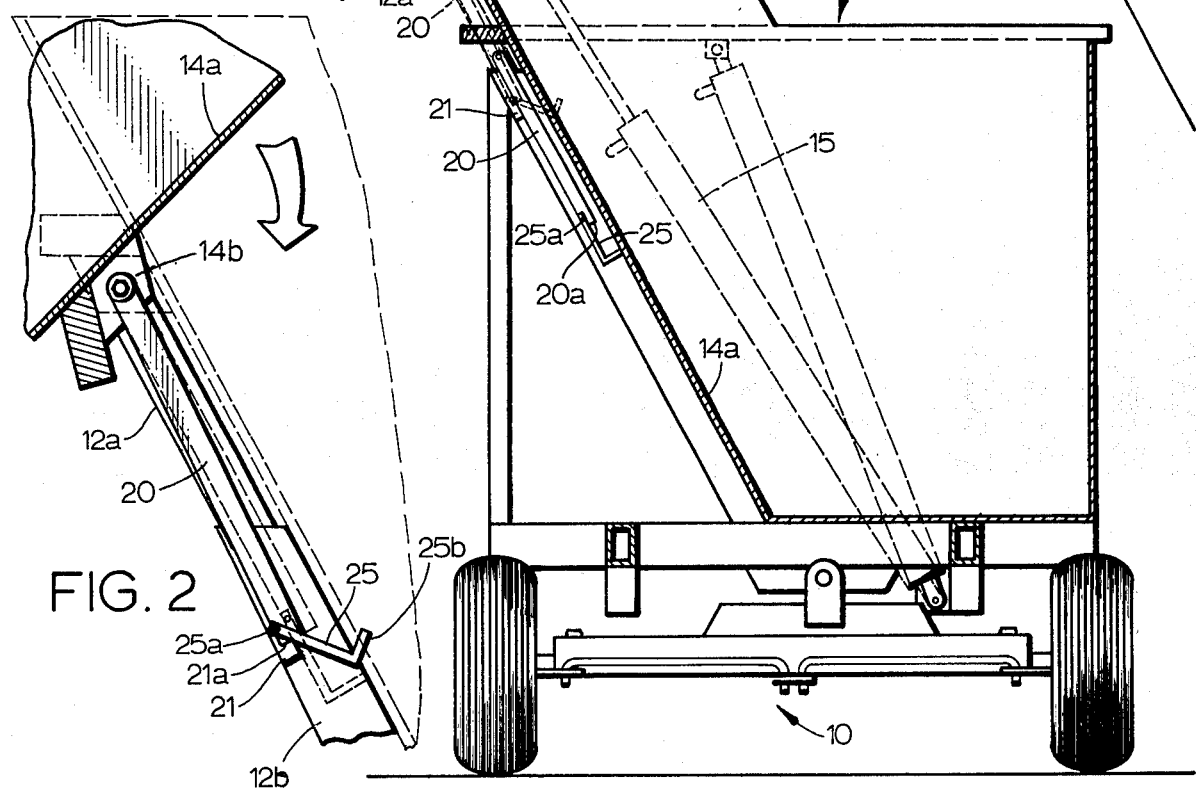
FIG. 4
FIG. 3
FIG. 2
FIG. 1

SAFETY LATCH FOR EXTENSIBLE LIFT MECHANISMS

BACKGROUND OF THE INVENTION AND SUMMARY OF THE INVENTION

This invention is related to the safety latch mechanism disclosed and claimed in U.S. Pat. No. 4,029,357. However, instead of using spring elements for swinging the latch bar upwardly into locking position, the present invention uses the force of gravity to swing the latch bar down into locking position and uses a positive lever action for lifting the bar out of latching position. By doing away with spring action to bias the latch bar into locking position, a more reliable and durable mechanism is provided.

DESCRIPTION OF THE DRAWINGS

FIG. 1 is a transverse vertical sectional view through a form dump box wagon embodying this invention;

FIG. 2 is an enlarged fragmentary view of the latch mechanism, per se, showing the box in fully elevated dumping position in full lines;

FIG. 3 is a view similar to FIG. 2, but showing in full lines, the dump box in lowered normal position with the latch in released position; and FIG. 4 is a fragmentary sectional view taken substantially along the section line 4-4 of FIG. 3.

DETAILED DESCRIPTION OF THE PREFERRED EMBODIMENT

A dump box embodying the features disclosed in U.S. Pat. No. 3,844,617 assigned to the assignee of the present invention, is illustrated in the accompanying drawings. The dump box unit includes a wheeled frame 10 having inclined strut members 12 having extensible sections 12a telescopically received within stationary hollow tubular sections 12b. A pair of double acting hydraulic cylinders 15 are pivotally connected to an intermediate portion of the upper portion of a box 14 which is pivotally mounted along its upper edge to the extensible strut elements 12a.

In the form shown, a latch bar 20 is pivotally mounted on the pivot pin 16 for the box 14 at the upper end of each extensible strut section 12a. Since the strut and latch bar are inclined as illustrated, the weight of the strut element 20 will cause it to swing down into engagement with a stop lug 21 fixed to each stationary strut member 12b and to ride along the upper surface thereof as the extensible strut elements 12a are being moved up or down by the hydraulic cylinders 15. Each stop lug 21 forms an abutment surface 21a at the upper edge and a bar-supporting shelf 21b. The supporting shelf 21b and abutment surface 21a form a recess to receive the lower end 20a of the latch bar 20 when each extensible section 12a is in fully raised or extended position. A stabilizing spring 20b surrounds the outer end portion of the pin 16 and holds the latch bar 20 in engagement with a bracket plate 14b fixed to the upper portion of the dump box 14 as best shown in FIG. 3.

The stop lug 21 is fixed in laterally extending relation to the stationary strut member 12b, as best shown in FIG. 4 and the latch bar 20 normally rides on the upper surface of the lug 21 as best shown in FIG. 3. However, when the extensible strut sections 12a have been fully extended, the lower end 20a of the latch bar 20 drops into the recess formed above lug 21 and engages the abutment 21a as is illustrated by full lines in FIG. 2.

An L-shaped release lever 25 is pivotally connected with the lower end of each latch bar 20 as by pivot pin 25a, and has an outwardly extending camming leg 25b normally engaged by the sloping sidewall 14a of the dump box 14 when the same is in lowered position. The upper edge of the stop lug shoulder 21a forms a fulcrum edge which engages the L-shaped release lever 25 at a point spaced downwardly from its pivot pin 25a and maintains the lower end of the latch bar 20 above the shoulder 21a as best shown by full lines in FIG. 2. When the dump box 14 has been swung up out of its normal rest position as shown by the dotted lines in FIG. 1 and by the full line fragmentary portion of the box shown in FIG. 2, the release lever 25 is free to swing up into the full line position shown in FIG. 2; however, when the box is swung down into its lowered rest position, the sloping sidewall 14a thereof engages and rests on the stationary strut member 12b as shown in FIG. 1 and also engages the camming leg 25b to raise the latch bar 20 above stop lug 21 and permits the extensible strut sections 12a to be lowered.

It will be seen that this invention provides a relatively simple gravity-actuated latch mechanism for positively holding the extensible strut elements in extended position whenever the dump box is tilted out of its normal lowered position on the wagon frame. The gravity actuation of the latch bar eliminates the need for springs to urge the same into latching position and provides a positive trouble-free automatic latching action in combination with the sloping strut elements of the dump box unit and a simple release mechanism for lifting the latch bar out of latching position whenever the dump box has been returned to its normal lowered position.

What is claimed is:

1. A safety latch for extensible lift mechanisms which includes a pair of inclined strut members, each having an extensible section and a stationary section,
   - a dump box pivotally mounted at its upper portion to the upper ends of said extensible sections for elevation therewith,
   - support means for positively positioning the dump box when in normal lowered position,
   - means for extending and retracting said extensible sections,
   - means for raising and lowering the box on its pivotal mounting,
   - an elongated latch bar pivotally connected at its upper end to the upper end of each of said inclined extensible sections whereby gravity urges the bar downwardly into latching position and having an abutment portion spaced from said upper end,
   - a positive stop lug fixed to the stationary section of said strut for engagement with said abutment portion of said latch bar when the extensible strut element is raised into fully extended position and the box is raised from its lowered position on said support means, thus positively preventing retraction of said strut section as long as the box is raised above its lowered position, and
   - releasing means having a box-engaging portion for engaging the box when the same is in normal lowered position to prevent the abutment portion of the bar from engaging the lug.

2. The structure set forth in claim 1 wherein gravity forms the sole means for urging the bar into latching position.

3. The structure set forth in claim 1 wherein a lug is mounted on each of the lower strut sections in outstanding relation thereto and in alignment with said latch bar whereby said latch bar normally engages the lug to ride thereon until the extensible strut section is in fully extended position, the latching portion of said bar engaging said lug to positively prevent the extensible strut section from being lowered when the box is raised above its lowered position, and a release lever engaged by said box when in lowered position to raise each latch bar above the lug and permit the extensible struts to be lowered.

4. The structure set forth in claim 3 wherein said releasing means constitutes a release lever pivotally mounted for engagement with the box when the same is in lowered position and arranged to lift the latching portion of said latch bar above the stop lug to permit the extensible sections to be lowered.

5. The structure set forth in claim 1 wherein said latch bar abutment portion constitutes the lower free end of the latch bar, and means for supporting the latch bar when the lower end is raised above said lug when the bar is in latching position.

6. The structure set forth in claim 1 wherein the pivotal mounting of the dump box is coaxial with the pivotal mounting of the latch bar.

7. The structure set forth in claim 6 wherein the latch bar is provided with a compression spring to provide axial stability for the pivotal mounting thereof while still providing a low resistance pivotal mounting thereof.

8. The structure set forth in claim 4 and said release lever having one end pivotally connected with the latch bar at the lower end portion thereof and engaging said stop lug when the latch bar is in latching position so that engagement by the dump box against the free end of said lever will raise the latch bar out of latching position to permit lowering of the extensible struts.

9. The structure set forth in claim 8 wherein said lever is generally L-shaped and the offset portion of the L forms a box-engaging camming element for producing said lifting action on the latch bar.

* * * * *